US012351431B2

(12) United States Patent
Appana, Jr.

(10) Patent No.: US 12,351,431 B2
(45) Date of Patent: Jul. 8, 2025

(54) SYSTEMS AND METHODS FOR ADJUSTING ELEVATOR LOAD SETTINGS

(71) Applicant: Appana Industries LLC, Jamaica, NY (US)

(72) Inventor: Amarnauth Appana, Jr., Jamaica, NY (US)

(73) Assignee: Appana Industries LLC, Jamaica, NY (US)

( * ) Notice: Subject to any disclaimer, the term of this patent is extended or adjusted under 35 U.S.C. 154(b) by 0 days.

(21) Appl. No.: 18/936,410

(22) Filed: Nov. 4, 2024

(65) Prior Publication Data

US 2025/0059000 A1 Feb. 20, 2025

Related U.S. Application Data

(63) Continuation of application No. 17/411,909, filed on Aug. 25, 2021.

(60) Provisional application No. 63/070,655, filed on Aug. 26, 2020.

(51) Int. Cl.

| | |
|---|---|
| ***B66B 1/34*** | (2006.01) |
| ***B66B 1/24*** | (2006.01) |
| ***B66B 1/28*** | (2006.01) |

(52) U.S. Cl.

CPC .......... *B66B 1/3407* (2013.01); *B66B 1/2466* (2013.01); *B66B 1/28* (2013.01); *B66B 1/3476* (2013.01); *B66B 2201/222* (2013.01); *B66B 2201/235* (2013.01); *B66B 2201/242* (2013.01)

(58) Field of Classification Search

CPC ....... B66B 1/3407; B66B 1/2466; B66B 1/28; B66B 1/3476; B66B 2201/222; B66B 2201/235; B66B 2201/242

See application file for complete search history.

(56) References Cited

U.S. PATENT DOCUMENTS 4,939,679 A 7/1990 David et al.
5,345,042 A 9/1994 Jamieson
5,407,030 A 4/1995 Burton et al.
5,490,580 A * 2/1996 Powell .................. B66B 1/2408 187/281

(Continued)

FOREIGN PATENT DOCUMENTS

EP 1478591 B1 12/2009
JP H0967070 A 3/1997

(Continued)

OTHER PUBLICATIONS

Extended European Search Report issued on Dec. 22, 2021 in counterpart European Patent Application No. 21190034.5 (8 pages, in English).

(Continued)

*Primary Examiner* — Jeffrey Donels

(74) *Attorney, Agent, or Firm* — Bookoff McAndrews, PLLC

(57) ABSTRACT

A method of adjusting a load setting of an elevator car that includes receiving one or more load measurements associated with the elevator car and determining a maximum load of the elevator car from the one or more load measurements. The method further includes generating a modified load setting for the elevator car based on the maximum load and replacing the load setting of the elevator car with the modified load setting.

18 Claims, 5 Drawing Sheets

(56) References Cited

U.S. PATENT DOCUMENTS

| | | | | |
|---|---|---|---|---|
| 9,573,789 B2 * | 2/2017 | Appana | B66B 1/2408 |
| 11,767,193 B2 * | 9/2023 | Scoville | B66B 1/3476 187/393 |
| 2018/0111787 A1 | 4/2018 | Patel | |

FOREIGN PATENT DOCUMENTS

| | | |
|---|---|---|
| JP | H0986808 A | 3/1997 |
| JP | 2008290805 A | 12/2008 |
| JP | 2019156636 A | 9/2019 |

OTHER PUBLICATIONS

Japanese Office Action issued on Oct. 4, 2022 in counterpart Japanese Patent Application No. 2021-135444 (4 pages, in Japanese).

* cited by examiner

SYSTEMS AND METHODS FOR ADJUSTING ELEVATOR LOAD SETTINGS

CROSS-REFERENCE TO RELATED APPLICATIONS

This application is a continuation of U.S. application Ser. No. 17/411,909, filed on Aug. 25, 2021, which claims the benefit of priority from U.S. Provisional Application No. 63/070,655, filed on Aug. 26, 2020, which are incorporated by reference in their entireties.

TECHNICAL FIELD

Aspects of the present disclosure relate generally to systems and methods for controlling elevator traffic flow, and specifically to examples of elevator control systems that dynamically adjust a load capacity setting of elevators based on a maximum detected load.

DESCRIPTION OF RELATED TECHNOLOGY

Elevator systems may generally preset a load capacity setting for elevator cars, which defines a maximum load that each elevator car may receive. The load capacity setting may be preset by a manufacturer of the elevator system or a user of the elevator system. In such systems, an elevator car having a current load that exceeds the preset load capacity may be ignored from consideration for calls from prospective passengers. However, prospective passengers may commonly forgo entering an elevator car that has a current load below the present load capacity for various reasons. For example, prospective passengers may prefer to enter elevator cars having a certain number of occupants that is less than the load capacity of the elevator car. As a result, an elevator car having a current load below the preset load capacity may be dispatched to a location of a prospective passenger but not occupied by the prospective passenger, thereby resulting in decreased traffic flow and greater wait times for prospective passengers who request another elevator car to be dispatched. Providing a system capable of dynamically adjusting a load capacity setting may result in dispatching elevator cars with a greater likelihood of receiving passengers, thereby increasing traffic flow and decreasing wait times for prospective passengers.

BRIEF DESCRIPTION OF DRAWINGS

The accompanying drawings, which are incorporated in and constitute a part of this disclosure, illustrate various exemplary embodiments and together with the description, serve to explain the principles of the disclosure.

Aspects of the disclosure may be implemented in connection with embodiments illustrated in the attached drawings. These drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure. There are many aspects and embodiments described herein. Those of ordinary skill in the art will readily recognize that the features of a particular aspect or embodiment may be used in conjunction with the features of any or all of the other aspects or embodiments described in this disclosure.

SUMMARY

Figure 1:
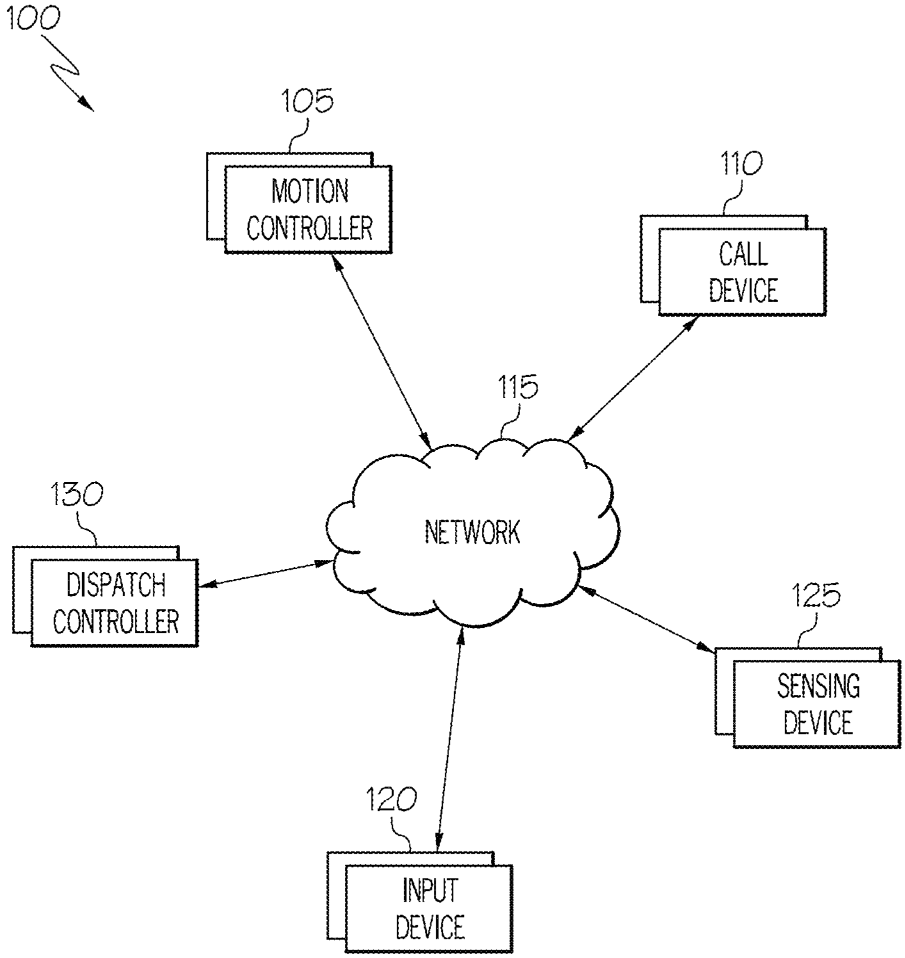
FIG. 1 depicts a dispatch system including one or more devices in communication over a network.

According to an example, a method of adjusting a load setting of an elevator car includes receiving one or more load measurements associated with the elevator car and determining a maximum load of the elevator car from the one or more load measurements. The method further includes generating a modified load setting for the elevator car based on the maximum load and replacing the load setting of the elevator car with the modified load setting for a predefined period.

According to another example, a method of operating a plurality of elevator cars includes measuring a load of each of the plurality of elevator cars during a predefined period and determining a maximum load of each of the plurality of elevator cars from the load measurements. The method further includes generating a modified load setting for each of the plurality of elevator cars based on the respective maximum load of each of the plurality of elevator cars, and applying the modified load setting of each of the plurality of elevator cars in place of a load setting during the predefined period. The modified load setting defines an adjusted capacity of each of the plurality of elevator cars relative to the load setting According to a further example, a method for positioning an elevator car includes determining an occupancy of each of a plurality of locations by determining a first load measurement of the elevator car upon arriving at each of the plurality of locations, determining a second load measurement of the elevator car upon departing from each of the plurality of locations, and determining a difference between the first load measurement and the second load measurement. The method further includes moving the elevator car to a first location with a total occupancy that is greater than the occupancy at each respective location of the plurality of locations when the elevator car is in an inactive state.

DETAILED DESCRIPTION

The dispatch system of the present disclosure may be in the form of varying embodiments, some of which are depicted by the figures and further described below.

Both the foregoing general description and the following detailed description are exemplary and explanatory only and are not restrictive of the features, as claimed. As used herein, the terms "comprises," "comprising," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. Moreover, in the claims, values, limits, and/or ranges mean the value, limit, and/or range +/−10%.

FIG. 1 shows an exemplary dispatch system 100 that may include motion controller 105, call device 110, input device 120, sensing device 125, and dispatch controller 130. The one or more devices of dispatch system 100 may communicate with one another across a network 115 and in any arrangement. For example, the devices of dispatch system 100 may be communicatively coupled to one another via a wired connection, a wireless connection, or the like. In some embodiments, network 115 may be a wide area network ("WAN"), a local area network ("LAN"), personal area network ("PAN"), etc. Network 115 may further include the Internet such that information and/or data provided between the devices of dispatch system 100 may occur online (e.g., from a location remote from other devices or networks coupled to the Internet). In other embodiments, network 115 may utilize Bluetooth® technology and/or radio waves frequencies.

Motion controller 105 may be operably coupled to a transportation unit and configured to detect and transmit motion data of the transportation unit to one or more devices of dispatch system 100, such as, for example, dispatch controller 130. For example, motion controller 105 may measure and record one or more parameters (e.g., motion data) of the transportation unit, including, but not limited to, a current location, a travel direction, a travel speed, a door location, a status (e.g., active, inactive, moving, parked, idle, etc.), and more. Motion controller 105 may include a computing device having one or more hardware components (e.g., a processor, a memory, a sensor, a communications module, etc.) for generating, storing, and transmitting the motion data. As described in further detail herein, motion controller 105 may be operably coupled to an elevator car located within a building, and dispatch system 100 may include at least one motion controller 105 for each elevator car.

Still referring to FIG. 1, call device 110 may be positioned outside the transportation unit and configured to receive a user input from one or more prospective occupants for accessing the transportation unit. For example, the user input may be indicative of a call requesting transportation from the transportation unit. Call device 100 may be configured to transmit the call request to one or more devices of dispatch system 100, such as, for example, dispatch controller 130. Call device 110 may include a keypad, a touchscreen display, a microphone, a button, a switch, etc. Call device 110 may be further configured to receive a user input indicative of a current location of the call request (e.g., a first location) and/or a destination location (e.g., a second location) from a plurality of locations.

As described in further detail herein, call device 110 may be located within a building, and dispatch system 100 may include at least one call device 100 for each floor of the building. Call device 100 may be configured to transmit a message from one or more devices of dispatch system 100 (e.g., dispatch controller 130) identifying an elevator car designated to arrive at the floor of the building to answer the call request. The message may be communicated by call device 100 via various suitable formats, including, for example, in a written form, an audible form, a graphic form, and more.

Input device 120 may be positioned inside the transportation unit and configured to receive a user input from one or more occupants of the transportation unit. For example, the user input may be indicative of a command requesting redirection of the transportation unit. Input device 120 may be configured to transmit the command to one or more devices of dispatch system 100, such as, for example, dispatch controller 130. Input device 120 may include a keypad, a touchscreen display, a microphone, a button, a switch, etc. As described in detail herein, input device 120 may be located within an elevator car, and dispatch system 100 may include at least one input device 100 for each elevator car in a building. In other embodiments, input device 120 may be omitted entirely from dispatch system 100.

Still referring to FIG. 1, sensing device 125 may be positioned inside or outside the transportation unit, and configured to detect and transmit sensor data associated with the transportation unit to one or more devices of dispatch system 100, such as, for example, dispatch controller 130. For example, sensing device 125 may measure and record a current load of the transportation unit, including, but not limited to, a weight measurement, a voltage direct current, and more. Sensing device 125 may include a load weighing device, such as, for example, a crosshead deflection device, a rope tension device, a platform movement device, a load sensor or cell (e.g., force transducer), etc. As described in further detail herein, sensing device 125 may be coupled to an elevator car that is located within a building, and dispatch system 100 may include at least one sensing device 125 for each elevator car of the building.

Dispatch controller 130 may be positioned outside the transportation unit and configured to receive data (e.g., motion data, a call request, a redirection command, sensor data, etc.) from one or more devices of dispatch system 100. Dispatch controller 130 may be configured to determine at least one transportation unit of a plurality of transportation units to dispatch to a location of a call request received from a prospective occupant seeking transportation. Dispatch controller 130 may be further configured to determine a current load of a transportation unit based on the data received from the one or more devices of dispatch system 100. Dispatch controller 130 may include a computing device (see FIG. 4) operable to perform one or more processes (see FIG. 5) for dynamically adjusting a load setting of transportation units and rendering said transportation units inoperable to receive a call request when a current load exceeds the load setting. Dispatch controller 130 may be further operable to perform one or more processes (see FIG. 6) for moving transportation units in an inactive state to a location with a total occupancy that is greater than an occupancy at a plurality of other locations. As described in further detail herein, dispatch controller 130 may be operably coupled to a plurality of elevator cars located within a building, and dispatch system 100 may include at least one dispatch controller 130 for each building.

Figure 2:
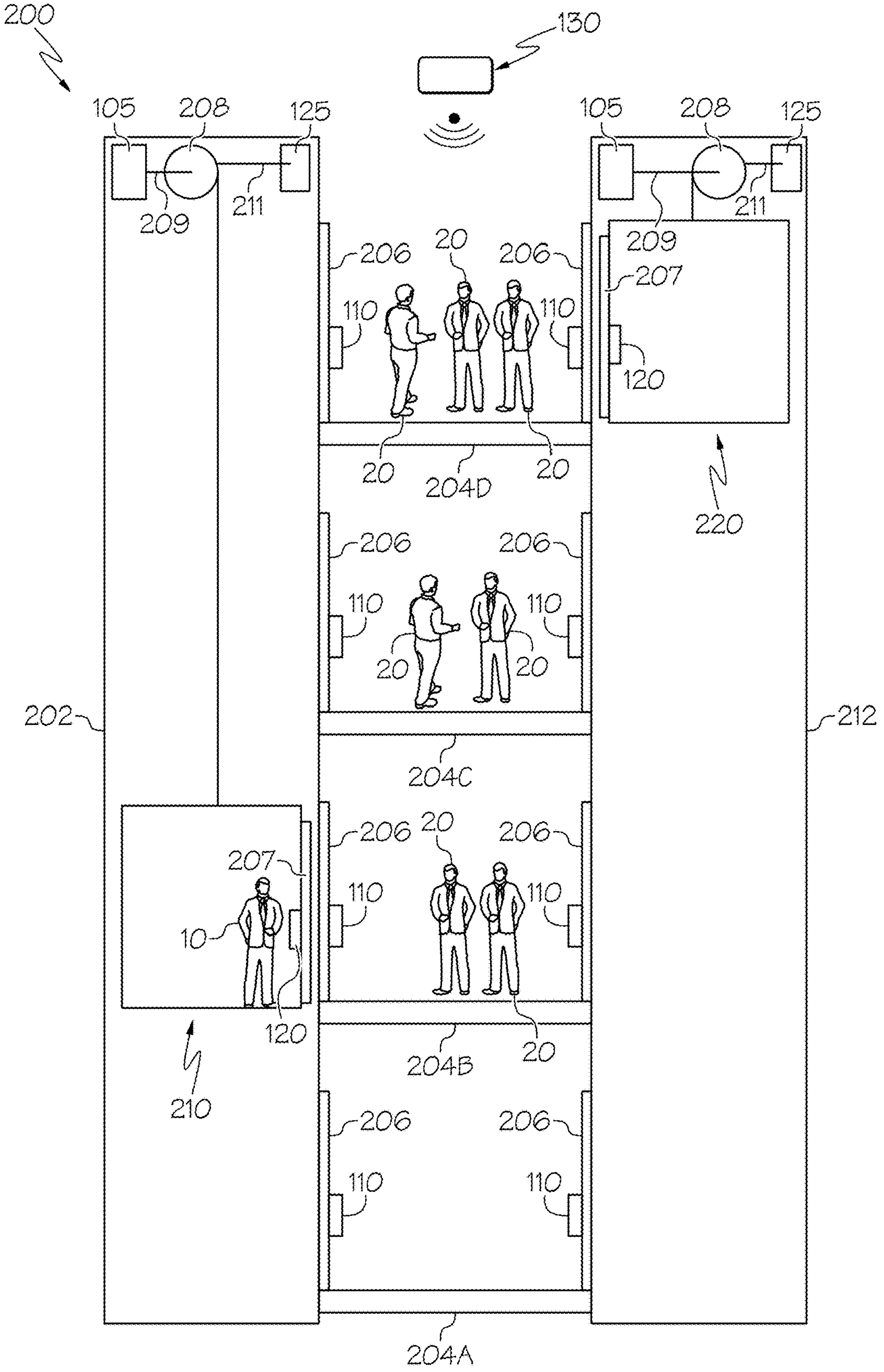
FIG. 2 is a schematic view of a working environment including multiple elevator cars interacting with the dispatch system shown in FIG. 1.

Referring now to FIG. 2, dispatch system 100 may be utilized in a working environment 200, such as a building (e.g., a facility, a factory, a store, a school, a house, an office, and various other structures). In the example, the transportation unit may include one or more elevator cars within the building. It should be appreciated that working environment 200 is merely illustrative such that dispatch system 100 may be utilized in various other suitable environments than those shown and described herein without departing from a scope of this disclosure. For example, the working environment may include a mass transit system such that the transportation unit(s) may include a bus, a train, a subway car, a metro car, a vehicle, etc. In the present example, working environment 200 may include a plurality of floors defining a plurality of locations within the building, such as first floor 204A, second floor 204B, third floor 204C, and fourth floor 204D. It should be appreciated that, in other embodiments, the building of working environment 200 may include additional and/or fewer floors.

Working environment 200 may further include one or more elevator shafts with at least one elevator car positioned within each elevator shaft. In the example, working environment 200 includes a first elevator shaft 202 with at a first elevator car 210 and a second elevator shaft 212 with a second elevator car 220. Although not shown, it should be appreciated that working environment 200 may include additional (e.g., a plurality) elevator shafts and/or elevator cars. Each elevator car 210, 220 may be coupled to a pulley system 208 configured to move elevator cars 210, 220 within elevator shafts 202, 212 and relative to floors 204A-204D. It should be understood that pulley system 208 may include various mechanical and/or electrical mechanisms for moving elevator cars 210, 220 within elevator shafts 202, 212, including but not limited to, a motor, a cable, a counterweight, a sheave, etc.

Still referring to FIG. 2, each elevator car 210, 220 may include at least one motion controller 105 operably coupled to pulley system 208, such as, for example, via a wireless connection and/or a wired connection 209. Motion controller 105 may be configured to measure motion data (e.g., a status) from elevator cars 210, 220 by detecting a relative movement of pulley system 208. Each elevator car 210, 220 may further include at least one input device 120 positioned within a cabin of elevator car 210, 220 for receiving a user input from one or more occupants 10 located within the cabin.

Each floor 204A-204D may include one or more call devices 110 and access doors 206 providing accessibility to elevator cars 210, 220 when an elevator door 207 of elevator car 210, 220 is aligned with the respective floor 204A-204D. Call device 110 may be configured to receive a user input from one or more prospective occupants 20 located at one of the plurality of floors 204A-204D. For example, call device 110 may be configured to receive a user input indicative of a call requesting transportation via at least one of elevator cars 210, 220. Call device 100 may be configured to transmit the call request to dispatch controller 130, which may include data indicative of a current location within working environment 200 from which the call request originated from. The call request may further include data indicative of a destination location within working environment 200 to which the prospective passenger is seeking transportation to.

Still referring to FIG. 2, each elevator car 210, 220 may further include at least one sensing device 125. Sensing device 125 may be coupled to elevator car 210, 220 and configured to detect a load (e.g., weight) of elevator car 210, 220. With elevator car 210, 220 including one or more occupants 10 within a cabin of elevator car 210, 220, sensing device 125 may be operable to correlate the detected load measurement to a number of occupants 10 within elevator car 210, 220. In some embodiments, sensing device 125 may be positioned on elevator car 210, 220 (e.g., within the cabin). In other embodiments, sensing device 125 may be positioned external to elevator car 210, 220 and coupled to pulley system 208. For example, sensing device 125 may include one or more connections 211 coupled to one or more components of pulley system 208 (e.g., a crosshead, a beam, a hitch, a rope, a platform, etc.).

Figure 3:
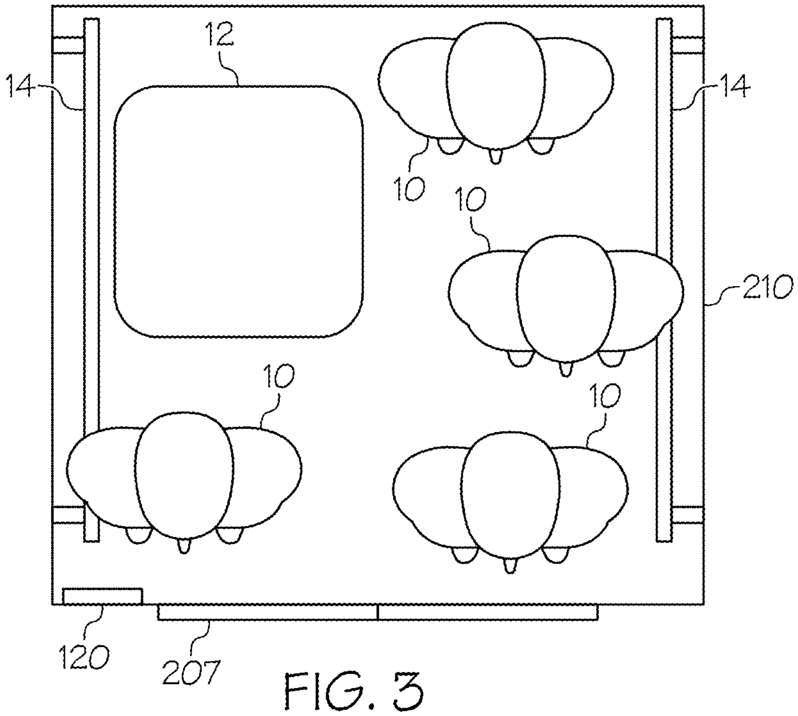
FIG. 3 is a top view of an interior of an elevator car from the working environment shown in FIG. 2.

As seen in FIG. 3, sensing device 125 may be configured to measure a total load of elevator cars 210, 220, including any items present within the cabin, and occupying a capacity, of elevator cars 210, 220 (e.g., occupants 10, ancillary objects 12, etc.). In some embodiments, sensing device 125 may detect a total load of elevator cars 210, 220, including a weight of elevator car 210, 220 and the one or more components of elevator car 210, 220 (e.g., rails 14, input device 120, doors 207, etc.). In other embodiments, sensing device 125 may detect a current load of elevator cars 210, 220 in exclusion of any items within the cabin that may not occupy a capacity of elevator cars 210, 220 (e.g., rails 14, input device 120, doors 207, etc.). Sensing device 125 may detect one or more load measurements of elevator cars 210, 220 and record such measurements as sensor data. As discussed further herein, sensing device 125 may be configured to transmit the sensor data for each elevator car 210, 220 to dispatch controller 130 via network 115 for determining an availability of the elevator car 210, 220 to receive prospective passengers 20 from one or more floors 204A-204D.

Figure 4:
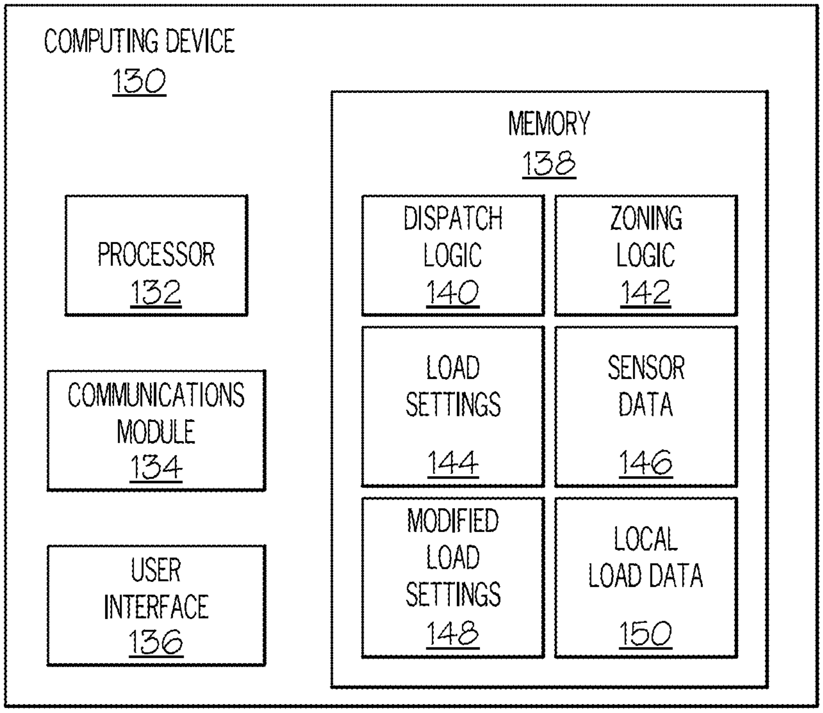
FIG. 4 is a schematic view of hardware components of a computing device from the dispatch system shown in FIG. 1.
Figure 5:
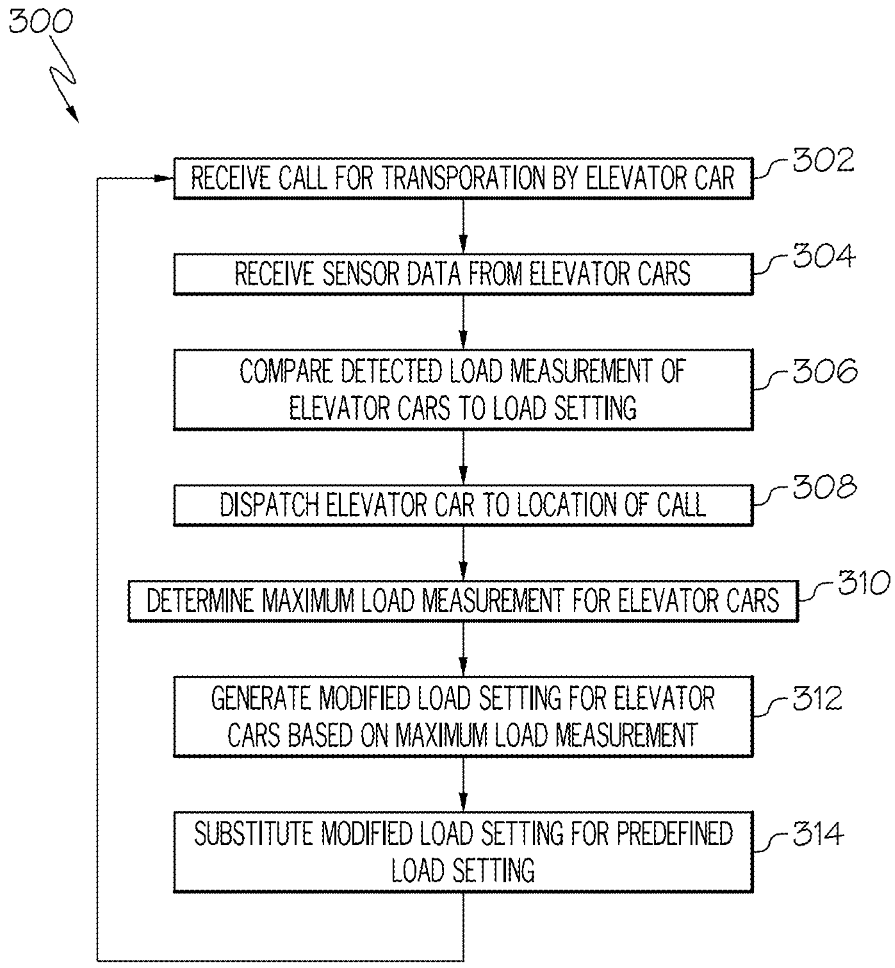
FIG. 5 is a flow diagram of an exemplary method of adjusting a load setting of elevator cars with the dispatch system shown in FIG. 1.
Figure 6:
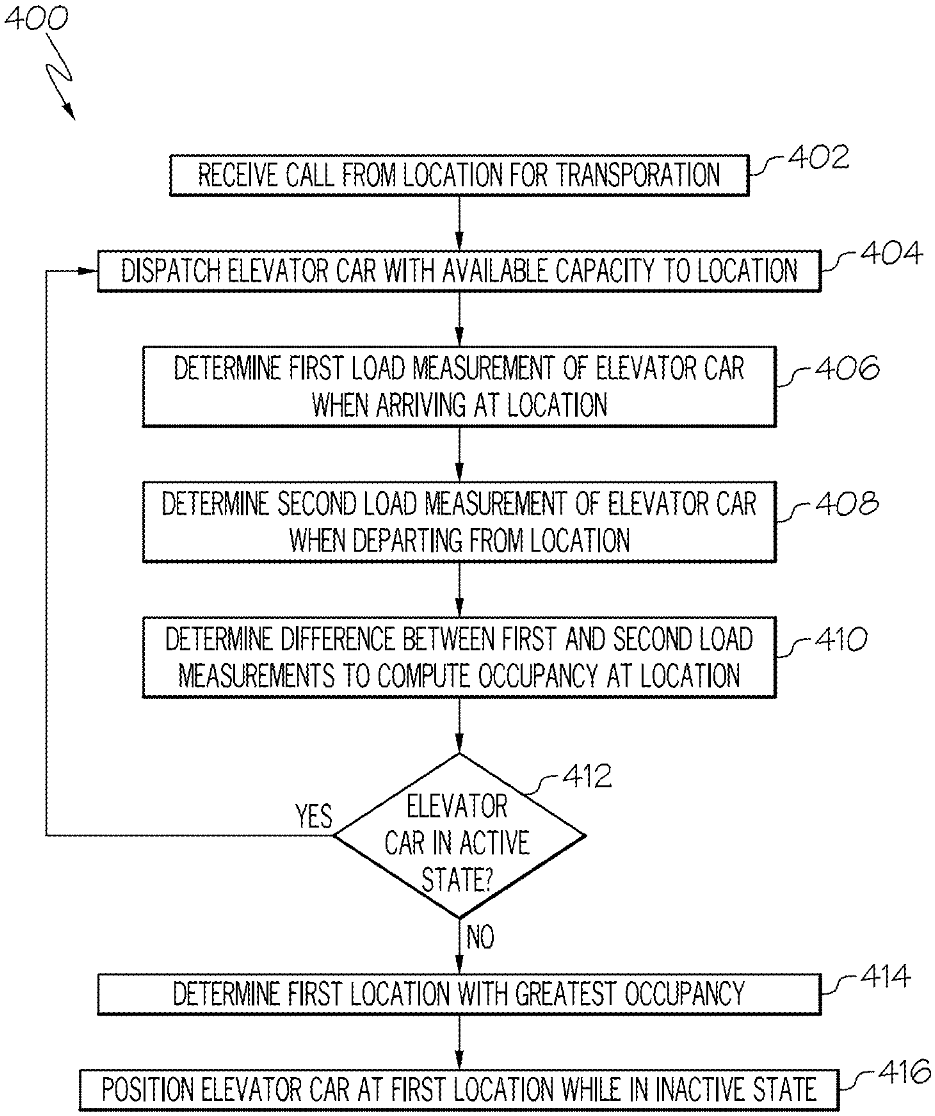
FIG. 6 is a flow diagram of an exemplary method of positioning inactive elevator cars with the dispatch system shown in FIG. 1.

Referring now to FIG. 4, dispatch controller 130 may include a computing device incorporating a plurality of hardware components that allow dispatch controller 130 to receive data (e.g., motion data, call requests, commands, sensor data, etc.), process information (e.g., current load measurements, load settings, etc.), and/or execute one or more processes (see FIGS. 5-6). Illustrative hardware components of dispatch controller 130 may include at least one processor 132, at least one communications module 134, a user interface 136, and at least one memory 138. In some embodiments, dispatch controller 130 may include a computer, a mobile user device, a remote station, a server, a cloud storage, and the like. In the illustrated embodiment, dispatch controller 130 is shown and described herein as a separate device from the other devices of dispatch system 100, while in other embodiments, one or more aspects of dispatch controller 130 may be integrated with one or more of the other devices of dispatch system 100. Stated differently, the illustrative hardware components of dispatch controller 130 shown and described herein may be integral with one or more of motion controller 105, call device 110, input device 120, and/or sensing device 125.

Processor 132 may include any computing device capable of executing machine-readable instructions, which may be stored on a non-transitory computer-readable medium, such as, for example, memory 138. By way of example, processor 132 may include a controller, an integrated circuit, a microchip, a computer, and/or any other computer processing unit operable to perform calculations and logic operations required to execute a program. As described in detail herein, processor 132 is configured to perform one or more operations in accordance with the instructions stored on memory 138, such as, for example, dispatch logic 140, zoning logic 142, and the like. Communications module 134 may facilitate communication between dispatch controller 130 and the one or more other devices of dispatch system 100, such as, for example, via network 115. User interface 136 may include one or more input and output devices, including one or more input ports and one or more output ports. User interface 136 may include, for example, a keyboard, a mouse, a touchscreen, etc., as input ports. User interface 136 may further include, for example, a monitor, a display, a printer, etc. as output ports. User interface 136 may be configured to receive a user input indicative of various commands, including, but not limited to, a command to execute one or more processes (FIGS. 5-6), a command defining a predefined period, a command to apply an automatic adjustment of a load setting, and more.

Still referring to FIG. 4, memory 138 may include various programming algorithms and data that support an operation of dispatch system 100. Memory 138 may include any type of computer readable medium suitable for storing data and algorithms, such as, for example, random access memory (RAM), read only memory (ROM), a flash memory, a hard drive, and/or any device capable of storing machine-readable instructions. Memory 136 may include one or more data sets, including, but not limited to, motion data received from motion controller 105, a load setting 144 for each of the plurality of elevator cars 210, 220, sensor data 146 captured from each sensing device 125, a modified load setting 148 for each of the plurality of elevator cars 210, 220, local load data 150, and the like.

Load settings 144 may include data indicative of a preset maximum load capacity for each of the plurality of elevator cars 210, 220. That is, load settings 144 may define a maximum weight that each elevator car 210, 220 may receive during use. It should be appreciated that the load settings 144 for each of the plurality of elevator cars 210, 220 may be the same, or vary, relative to one another. Load settings 144 may be predefined by, for example, a user of dispatch system 100 (e.g., via user interface 136). In some embodiments, load settings 144 may be modified by the user. Sensor data 146 may include a real-time load measurement of each elevator car 210, 220, indicative of a number of occupants 10 (and/or ancillary objects 12) located within a cabin of elevator cars 210, 220. In some embodiments, the sensor data 146 stored in memory 138 may include a maximum load measurement of a respective elevator car 210, 220 detected by sensing device 125. As described in detail herein, modified load settings 148 may include an updated load setting (e.g., maximum load capacity) for each of the plurality of elevator cars 210, 220 based on data received from the one or more devices of dispatch system 100 (e.g., sensing device 125). Dispatch controller 130 may be configured to dynamically generate the modified load settings 148 based on one or more load measurements received from sensing devices 125 of elevator cars 210, 220.

Still referring to FIG. 4, the modified load settings 148 may further include a predefined period during which the modified load settings 148 may be applied by dispatch controller 130. Dispatch controller 130 may be configured to replace the load settings 144 with the modified load settings 148 during the predefined period. In some embodiments, dispatch controller 130 may be configured to autonomously determine the predefined period, while in other embodiments a user of dispatch system 100 may manually select the predefined period (e.g., via user interface 136).

Local load data 150 may include a load balance measurement at each of the plurality of locations within working environment 200, and may be indicative of a number of occupants 10 located at each of the plurality of floors 204A-204D. Dispatch controller 130 may be configured to compute the local load data 150, which may correspond to a load of items (e.g., occupants 10, ancillary objects 12, etc.) transported to and from each of the plurality of floors 204A-204D by at least one of the plurality of elevator cars 210, 220. Dispatch controller 130 may be further configured to store the local load data 150 in memory 138 and associate the load with a number of occupants located at a particular location within working environment 200 (e.g., floors 204A-204D). For example, dispatch controller 130 may receive and correlate the motion data received from motion controller 105 with the sensor data 146 received from sensing device 125 to determine the local load data 150.

In some embodiments, dispatch controller 130 may be configured to periodically (e.g., hourly, daily, weekly, monthly, yearly, etc.) update the modified load settings 148 for each of the plurality of elevator cars 210, 220 based on receiving additional load measurements (e.g., sensor data 146) from sensing devices 125. In further embodiments, dispatch controller 130 may be further configured to periodically update the local load data 150 upon determining one or more elevator cars 210, 220 have traveled to and/or from floors 204A-204D to transport at least one occupant 10. That is, dispatch controller 130 may continuously modify the local load data 150 to include a current load balance measurement at each floor 204A-204D based on determining a number of occupants 10 arriving to, or leaving from, each floor 204A-204D (e.g., as detected by sensing device 125).

Still referring to FIG. 4, memory 138 may include a non-transitory computer readable medium that stores machine-readable instructions thereon, such as, dispatch logic 140 and zoning logic 142. In one example, dispatch logic 140 may include executable instructions that allow dispatch system 100 to determine an occupant capacity of each elevator car 210, 220 based on a current load measurement of each elevator car 210, 220 (e.g., sensor data 146). As described in detail herein, dispatch system 100 may be configured to determine whether a current load of each elevator car 210, 220 (indicative of a number of occupants present within the cabin) exceeds a maximum load capacity of the respective elevator car 210, 220 (e.g., load setting 144, modified load setting 148). When the maximum load capacity of at least one elevator car 210, 220 is exceeded, dispatch system 100 may render the particular elevator car inoperable to answer additional call requests from prospective occupants 20 seeking transportation. That is, dispatch system 100 disregards the elevator car from further consideration when determining which of the plurality of elevator cars 210, 220 to dispatch to a new call request(s) until the current load of the elevator car no longer exceeds the maximum load capacity.

In another example, zoning logic 142 may include executable instructions that allow dispatch system 100 to determine when one or more of the plurality of elevator cars 210, 220 is in an inactive state, and which location (e.g., a first location) to park elevator cars at while in the inactive state. The executable instructions of zoning logic 142 may further allow dispatch system 100 to determine an amount of load transferred by elevator cars 210, 220 to a plurality of locations (e.g., floors 204A-204D) to identify a first location having a greater load balance than the remaining plurality of locations.

Referring now to FIG. 5, an example method 300 of using dispatch system 100 to dynamically adjust a load setting of an elevator car, and to render the elevator car inoperable for receiving calls when a current load exceeds the load setting, is depicted. It should be understood that the steps shown and described herein, and the sequence in which they are presented, are merely illustrative such that additional and/or fewer steps may be included in various arrangements without departing from a scope of this disclosure.

At step 302, dispatch system 100 may receive a call at a location of a plurality of locations within working environment 200. The call may be initiated in response to a prospective occupant 20 actuating call device 110 at the location (e.g., a first location). Call device 100 may transmit the call to dispatch controller 130 via network 115, and the call may include data indicative of the first location (e.g., fourth floor 204D) from which the call originated from. The call may further include data indicative of a destination (e.g., a second location) within working environment 200 to which the prospective occupant 20 seeks to travel, such as first floor 204A.

Dispatch controller 130, in accordance with dispatch logic 140, may retrieve motion data of each elevator car 210, 220, from a corresponding motion controller 105, to determine movement parameters of elevator cars 210, 220. For example, dispatch controller 130 may receive data including a current location, a travel direction, a travel speed, etc., of each elevator car 210, 220. Dispatch controller 130 may further retrieve a load measurement (e.g., sensor data 146) of each elevator car 210, 220, from a corresponding sensing device 125, at step 304. Dispatch controller 130 may be configured to determine a current load of each of elevator cars 210, 220 based on the sensor data 146.

Still referring to FIG. 5, at step 306, dispatch controller 130 may compare the current load measurement of each elevator car 210, 220 to a respective load setting 144 to determine whether the current load exceeds a maximum load capacity (e.g., the load setting 144) of the elevator car 210, 220. Load setting 144 may include various suitable capacities, including, but not limited to, a range of about 1,000 pounds to about 3,000 pounds. In the present example, the load setting 144 of first elevator car 210 may be about 1,500 pounds, and the lead setting 144 of second elevator car 220 may be about 1,400 pounds. Dispatch controller 130 may be configured to analyze the motion data and the sensor data 146 of the plurality of elevator cars 210, 220 to determine which elevator car 210, 220 to dispatch to the first location, at step 308.

For example, in response to determining the current load does not exceed the load setting 144, dispatch controller 130 may be configured to render the elevator car 210, 220 operable to receive the call. That is, dispatch controller 130 may determine the elevator car 210, 220 is available for consideration when determining which of the plurality of elevator cars 210, 220 to dispatch to the call request. In response to determining the current load exceeds the load setting 144, dispatch controller 130 may be configured to render the elevator car 210, 220 inoperable to receive the call. In this instance, dispatch controller 130 may determine the elevator car 210, 220 is unavailable such that the elevator car 210, 220 is omitted from consideration when determining which of the plurality of elevator cars 210, 220 to dispatch to the call.

In the present example, first elevator car 210 may include a current load of about 200 pounds and second elevator car 212 may include a current load of about 0 pounds. Additionally, first elevator car 210 may be positioned further from the first location (e.g., fourth floor 204D) than second elevator car 220 when the call is received at step 302. Accordingly, second elevator car 220 may be determined as an optimal elevator car from the plurality of elevator cars 210, 220 to dispatch to fourth floor 204D. In some embodiments, dispatch controller 130 may be configured to communicate with call device 110 to transmit a message to the prospective occupant 20 at the first location. For example, dispatch controller 130 may communicate an identification of the second elevator car 220 assigned to answer the call. In other embodiments, dispatch controller 130 may identify second elevator shaft 212 from which second elevator car 220 may arrive. The message may be transmitted via call device 110 in various suitable formats, including, for example, via a display (e.g., a written form, a graphic form, etc.), a speaker (e.g., an audible form), and more.

Dispatch controller 130 may be configured to store the sensor data 146 of each of the plurality of elevator cars 210, 220 in memory 138. It should be appreciated that dispatch controller 130 may continuously store sensor data 146 of elevator cars 210, 220 in response to the repeated use of dispatch system 100 when receiving calls (step 302) and obtaining sensor data 146 (step 304) to determine which of the plurality of elevator cars 210, 220 to dispatch to the call (step 308). Accordingly, memory 138 may provide a database of load measurements for each of the plurality of elevator cars 210, 220. Further, dispatch controller 130 may determine a timing of when each load measurement is received by dispatch controller 130 such that the sensor data 146 stored in memory 138 may be associated with a corresponding time interval. It should be appreciated that the sensor data 146 may be accessible for review by a user of dispatch system 100 via user interface 136.

At step 310, dispatch controller 130 may be configured to determine a maximum load of each elevator car 210, 220 from the one or more load measurements received from sensing devices 125 during one or more predefined periods. The predefined period may include various time intervals during which sensor data 146 is received from the plurality of elevator cars 210, 220. For example, the predefined period may include, but is not limited to, one or more hours of a day, one or more days of a week, one or more weeks of a month, one or more months of a year, etc. Accordingly, dispatch controller 130 may determine the maximum load measurement of each elevator car 210, 220 for a particular predefined period. It should be appreciated that memory 138 may include corresponding load measurements (e.g., sensor data 146) for a plurality of predefined periods.

In the present example, the predefined period may include a two-hour duration (e.g., 12:00 PM to 2:00 PM) during weekdays (e.g., Monday, Tuesday, Wednesday, Thursday, and Friday). In this instance, the maximum load measurement of each elevator car 210, 220 may be determined from the one or more load measurements received from elevator cars 210, 220 during the two-hour duration of each weekday. At step 314, dispatch controller 130 may be configured to generate a modified load setting 148 for each elevator car 210, 220 based on the maximum load received by each respective elevator car 210, 220 during the predefined period. That is, the modified load setting 148 may be equal to the greatest load measurement received by each elevator car 210, 220 during the predefined period.

In some embodiments, dispatch controller 130 may receive a user input (e.g., via user interface 136), at step 312, with a command to determine the modified load setting 148 for one or more of the plurality of elevator cars 210, 220. It should be appreciated that each modified load setting 148 may be associated with a particular elevator car 210, 220 and a particular predefined period during which the maximum load measurement, from which the modified load setting 148 is derived from, was received. It should be understood that the modified load setting 148 may be applicable to the predefined period.

In the present example, the maximum load measurement received by first elevator car 210 during the predefined period may equal about 1,100 pounds, and the maximum load measurement received by second elevator car 220 during the predefined period may equal about 1,300 pounds. Accordingly, dispatch controller 130 may adjust the original load setting 144 of first elevator car 210 from 1,500 pounds to 1,100 pounds (e.g., the modified load setting 148) during the two-hour duration on weekdays. Dispatch controller 130 may further adjust the load setting 144 of second elevator car 220 from 1,400 pounds to 1,300 pounds (e.g., the modified load setting 148) during the two-hour duration on weekdays.

In other embodiments, dispatch controller 130 may be configured to automatically generate the modified load setting 148 for one or more of the plurality of elevator cars 210, 220. For example, dispatch controller 130 may automatically generate the modified load setting 148 based on determining the maximum load measurement is less than the load setting 144 by a predetermined threshold. The predetermined threshold may be determined by dispatch controller 130 or defined by a user of dispatch system 100. In some examples, the predetermined threshold may range from about 5% to about 95%.

In the present example, the predetermined threshold may be set to about 20%. With the maximum load measurement of first elevator car 210 (e.g., 1,100 pounds) being less than the load setting 144 of first elevator car 210 (e.g., 1,500 pounds) by about 27%, dispatch controller 130 may automatically generate the modified load setting 148 for first elevator car 210. Further, with the maximum load measurement of second elevator car 220 (e.g., 1,300 pounds) being less than the load setting 144 of second elevator car 220 (e.g., 1,400 pounds) by about 7%, dispatch controller 130 may forgo generating the modified load setting 148 for second elevator car 220. It should be appreciated that dispatch controller 130 may be operable to account for small losses in load measurements attributed to various sources, including the sensing device 146, hoist way issues, and more.

Still referring to FIG. 5, at step 314, dispatch controller 130 may be configured to apply the modified load setting 148 in substitute of the load setting 144. It should be understood that the modified load setting 148 may be an adjustment to the load setting 144, and applicable in lieu of the original load setting 144, during the predefined period. In this instance, when receiving a new call request (step 302) during the predefined period (e.g., between 12:00 PM to 2:00 PM on weekdays), dispatch controller 130 may compare a detected load measurement of the elevator car 210, 220 (step 304) to the modified load setting 148 (step 306) when determining whether the elevator car 210, 220 includes sufficient capacity to receive the call.

Referring now to FIG. 6, an example method 400 of using dispatch system 100 to determine an occupancy at a plurality of locations, and to position inactive elevator cars at the location having a greater occupancy, is depicted. It should be understood that the steps shown and described herein, and the sequence in which they are presented, are merely illustrative such that various embodiments may include additional and/or fewer steps without departing from a scope of this disclosure. Further, it should be appreciated that dispatch system 100 may perform example method 400 in conjunction with one or more other processes, such as method 300 described above.

At step 402, dispatch system 100 may receive a call request at a location of a plurality of locations within working environment 200. The call may be initiated in response to a prospective occupant 20 actuating call device 110 at the location (e.g., one of floors 204A-204D). Call device 100 may transmit the call to dispatch controller 130 via network 115. In the present example, dispatch controller 130 may receive the call from a first location (e.g., second floor 204B) for transportation to a second location (e.g., first floor 204A). Dispatch controller 130, in accordance with zoning logic 142, may receive motion data from a corresponding motion controller 105 of each elevator car 210, 220 to determine current motion parameters of the plurality of elevator cars 210, 220.

Dispatch controller 130 may further receive sensor data 146 from a corresponding sensing device 125 of each elevator car 210, 220 to determine a current load of elevator cars 210, 220. Motion controller 105 and sensing device 125 may each transmit a signal to dispatch controller 130 (via network 115) indicative of the motion data and the sensing data 146 of the corresponding elevator car 210, 220, respectively. At step 404, dispatch controller 130 may dispatch at least one of the plurality of elevator cars 210, 220 having a current load that does not exceed the respective load setting 144 (and/or modified load setting 148) of the elevator car 210, 220, such as, for example, in accordance with the steps of method 300 described above. In the present example, first elevator car 210 may be dispatched to the first location of the call (e.g., second floor 204B) to pick up the prospective occupant 20.

Still referring to FIG. 6, at steps 406 to 410, dispatch controller 130 may be configured to determine an occupancy at a plurality of locations. For example, at step 406, dispatch controller 130 may be configured to determine a first load measurement of first elevator car 210 when arriving at the first location (e.g., a load start value). In this instance, sensing device 125 may transmit a signal to dispatch controller 130 of the first load measurement (e.g., sensor data 146) when the motion parameters received from motion controller 105 indicate first elevator car 210 has arrived at the first location. In the present example, the first load measurement may include a load indicative of a single occupant 10 located within the cabin of first elevator car 210 when arriving at second floor 204B.

At step 408, dispatch controller 130 may be configured to determine a second load measurement of first elevator car 210 when departing from the first location (e.g., a load end value). In this instance, sensing device 125 may transmit a signal to dispatch controller 130 of the second load measurement (e.g., sensor data 146) when the motion parameters received from motion controller 105 indicate first elevator car 210 has departed the first location. In the present example, the second load measurement may include a load indicative of a pair of occupants 10 located within the cabin of first elevator car 210 when departing second floor 204B. At step 410, dispatch controller 130 may be configured to determine a difference between the first load measurement (step 406) and the second load measurement (step 408) to compute a resulting occupancy at the first location. Accordingly, to determine a corresponding number of prospective occupants 10 received from (and/or transferred to) the first location, dispatch controller 130 may compare the first load measurement of first elevator car 210 when arriving at second floor 204B to the second load measurement after departing from second floor 204B.

In the present example, first elevator 210 may include a first load measurement of about 150 pounds to about 200 pounds upon arriving to the first location, and about 300 pounds to about 400 pounds upon departing from the first location to the destination location (e.g., first floor 204A). Accordingly, dispatch controller 130 may be configured to determine that about one prospective occupant 20 entered first elevator car 210 from second floor 204B. It should be appreciated that dispatch controller 130 may store a predetermined occupant load in memory 138. In this instance, dispatch controller 130 may correlate the one or more load measurements to a number of occupants 10 via conversion with the predetermined occupant load. For example, the predetermined occupant load may range from about 100 pounds to about 300 pounds, such as 150 pounds. In other embodiments, the one or more load measurements may be in various other metric forms, including, for example, volts direct current (VDC). In this instance, dispatch controller 130 may correlate one volt to a predetermined load variable, such as, for example, a weight ranging from about 100 pounds to about 300 pounds. It should be appreciated that various other suitable metrics of the load measurements may be implemented by dispatch system 100 without departing from a scope of this disclosure.

Still referring to FIG. 6, at step 412, dispatch controller 130 may determine whether the elevator car 210, 220 is in an inactive state. For example, dispatch controller 130 may be configured to determine an operating status of first elevator car 210, such as whether first elevator car 210 is actively completing a call and/or is assigned to answer an additional call. In the present example, upon receiving the prospective occupant 20 from second floor 204B (e.g., the first location), first elevator car 210 may be dispatched to a destination of the prospective occupants 20 (e.g., a second location) to complete the call request. Accordingly, dispatch controller 130 may determine first elevator car 210 remains in an active state at step 412, and return to step 404 to dispatch first elevator car 210 to the second location. Dispatch controller 130 may be configured to repeat steps 406 to 410 to determine an occupancy of the second location (e.g., first floor 204A). Accordingly, dispatch controller 130 may measure a first load measurement of first elevator car 210 upon arriving to the second location (step 406) and a second load measurement upon departing from the second location (step 408). Dispatch controller 130 may determine a difference (i.e., percent load change) between the first and second load measurements (step 410) to compute a resulting occupancy at the second location.

It should be understood that dispatch controller 130 may compute a percent load change for each of the plurality of locations when at least one of the plurality of elevator cars 210, 220 travels to said location to answer a call (e.g., pick up a prospective occupant 20) and/or to complete a call (e.g., drop off an occupant 10). Dispatch controller 130 may generate local load data 150 for the first and second locations based on the occupancy computed at step 410, respectively. The local load data 150 may include a measurement of a load transferred by first elevator car 210 to and/or from the first location (e.g., second floor 204B) and the second location (e.g., first floor 204A). The local load data 150 may be indicative of a number of occupants 10 located at the location after an arrival and departure of first elevator car 210 from said location.

It should be understood that the local load data 150 may include a comprehensive measurement that accounts for a cumulative load transported to, and from, the location by the plurality of elevator cars 210, 220. Accordingly, dispatch controller 130 may maintain a current occupancy determination for each of the plurality of locations. Dispatch controller 130 may be configured to store the local load data 150 in memory 138, and continuously update the local load data 150 for each of the plurality of floors 204A-204D during continued use of dispatch system 100.

Still referring to FIG. 6, at step 412, dispatch controller 130 may determine whether the elevator car 210, 220 is in an inactive state. Dispatch controller 130 may determine that first elevator car 210 is in an inactive state when no further calls are assigned to first elevator car 210, and/or first elevator car 210 does not include additional destinations from existing calls. In response to determining first elevator car 210 is in an inactive state at step 412, dispatch controller 130 may be configured to determine at least one location of the plurality of locations that has a maximum occupancy at step 414. That is, dispatch controller 130 may be configured to compare the local load data 150 of the plurality of locations relative to one another to assess a current occupancy at each location.

Dispatch controller 130 may determine fourth floor 204D includes an occupancy that is greater than the occupancy of the remaining plurality of locations. In the present example, as seen in FIG. 2, first floor 204A may include two occupants 20 (e.g., recently transported thereto by first elevator car 210), second floor 204B may include one remaining occupant 20, third floor 204C may include two occupants 20, and fourth floor 204D may include three occupants 20. Accordingly, dispatch controller 130 may determine that fourth floor 204D includes a current occupancy that is greater than the occupancy of the remaining floors 204A-204C.

At step 416, dispatch controller 130 may be configured to move first elevator car 210 to fourth floor 204D. First elevator car 210 may be positioned at fourth floor 204D while first elevator car 210 remains in an inactive state. Stated differently, first elevator car 210 may be parked at fourth floor 204D until a call request from one of the plurality of floors 204A-204D (e.g., via call device 110) is assigned to first elevator car 210 by dispatch controller 130. It should be appreciated that, with first elevator car 210 maintained at fourth floor 204D, and with fourth floor 204D including a greater occupancy than the remaining plurality of floors 204A-204C, a minimum travel distance for answering a future call request with first elevator car 210 may be minimized.

It should be appreciated that dispatch controller 130 may be configured to periodically reassess the current occupancy (e.g., local load data 150) of each of the plurality of floors 204A-204D. Accordingly, dispatch controller 130 may move one or more inactive elevator cars 210, 220 to a modified location based on updated local load data 150. For example, in response to determining the first location (identified at step 414) no longer includes a greater occupancy relative to the plurality of other locations, dispatch controller 130 may be configured to reposition the inactive elevator car(s) 210, 220 to a second location having the greatest occupancy.

In some embodiments, method 300 may include further steps for positioning one or more inactive elevators at additional locations when a number of inactive elevator cars 210, 220 at the first location (e.g., fourth floor 204D) exceeds a predetermined threshold. In other embodiments, a user of dispatch system 100 may identify a number of locations at which the plurality of elevator cars 210, 220 may be parked at when in an inactive state. For example, dispatch controller 130 may receive a user input (e.g., via user interface 136) indicating three locations for parking inactive elevator cars 210, 220. In this instance, dispatch controller 130 may determine which three locations of the plurality of locations have the greatest occupancy relative to the remaining plurality of locations, and direct any inactive elevator cars 210, 220 to at least one of the three locations. In some embodiments, dispatch controller 130 may be operable to generate a report (e.g., via user interface 136) including information relating to one or more of the load setting 144, the sensor data 146, the modified load setting 148, the local load data 150, and more.

It should be appreciated that the one or more processes of dispatch system 100 shown and described herein, such as example methods 300, 400, may be implemented in various other working environments. In one example, dispatch system 100 may be configured to apply one or more of example methods 300, 400 in a transit system, such as a bus service, a train service, a subway service, a metro service, a ride-sharing service, etc. With respect to example method 300, dispatch system 100 may render a transportation unit (e.g., a bus, a train, a subway, a metro, a vehicle, etc.) inoperable for receiving additional calls and/or occupants when exceeding its maximum load capacity. In this instance, the transportation unit may bypass the location (e.g., the stop) and/or inhibit receipt of additional load onto the transportation unit (e.g., by not opening doors). In some embodiments, dispatch system 100 may be configured to communicate with one or more remote stations to transmit information indicative of a current load.

For example, dispatch system 100 may transmit alerts to remote station(s) requesting assistance from additional transportation units (e.g., a bus, a train, a subway, a metro, a vehicle, etc.) at one or more locations when the current load of one or more current transportation units exceed a maximum load capacity. It should be appreciated that dispatch system 100 may promote traffic flow by determining a minimum number of transportation units required at one or more locations, or at one or more predefined intervals, to accommodate an expected load based on local load data of various locations. With respect to example method 400, dispatch system 100 may determine an occupancy at a plurality of locations (e.g., bus stops, train stops, subway stops, metro stops, etc.) to position inactive transportation unit (e.g., a bus, a train, a subway, a metro, a vehicle, etc.) at the location having a greater occupant count.

All technical and scientific terms used herein have the same meaning as commonly understood to one of ordinary skill in the art to which this disclosure belongs unless clearly indicated otherwise. As used herein, the singular forms “a”, “an”, and “the” include plural references unless the context clearly dictates otherwise.

The above description is illustrative and is not intended to be restrictive. One of ordinary skill in the art may make numerous modifications and/or changes without departing from the general scope of the disclosure. For example, and as has been described, the above-described embodiments (and/or aspects thereof) may be used in combination with each other. Additionally, portions of the above-described embodiments may be removed without departing from the scope of the disclosure. In addition, modifications may be made to adapt a particular situation or material to the teachings of the various embodiments without departing from their scope. Many other embodiments will also be apparent to those of skill in the art upon reviewing the above description.

What is claimed is:

1. A method of adjusting a load setting of an elevator car, comprising:
- receiving one or more load measurements associated with the elevator car during a predefined period;
- determining a maximum load of the elevator car from the one or more load measurements such that the maximum load of the elevator car is associated with the predefined period;
- generating a modified load setting for the elevator car based on the maximum load; and
- replacing the load setting of the elevator car with the modified load setting for the predefined period.

2. The method of claim 1, further comprising:
- receiving a new load measurement associated with the elevator car; and
- comparing the new load measurement to the modified load setting.

3. The method of claim 2, further comprising:
- rendering the elevator car inoperable to receive a call in response to the new load measurement exceeding the modified load setting; or
- rendering the elevator car operable to receive the call in response to the new load measurement not exceeding the modified load setting.

4. The method of claim 1, further comprising:
- replacing the modified load setting with the load setting upon completion of the predefined period.

5. The method of claim 4, further comprising:
- receiving a new load measurement associated with the elevator car after completion of the predefined period;
- comparing the new load measurement to the load setting; and
- rendering the elevator car inoperable to receive a call in response to the new load measurement exceeding the load setting, or rendering the elevator car operable to receive the call in response to the new load measurement not exceeding the load setting.

6. The method of claim 1, further comprising:
- receiving one or more load measurements during a plurality of predefined periods;
- determining a corresponding maximum load of the elevator car for each of the plurality of predefined periods; and
- generating at least one modified load setting for each of the plurality of predefined periods based on the corresponding maximum load.

7. The method of claim 1, wherein prior to generating the modified load setting for the elevator car, the method comprises:
- comparing the maximum load to the load setting;
- determining a difference between the maximum load and the load setting; and
- determining the difference exceeds a predetermined threshold, wherein the modified load setting is generated in response to the difference exceeding the predetermined threshold.

8. The method of claim 1, wherein the load setting defines a first maximum load capacity of the elevator car, and the modified load setting defines a second maximum load capacity of the elevator car that is less than the first maximum load capacity.

9. A method of operating a plurality of elevator cars, comprising:
- measuring one or more load measurements of each of the plurality of elevator cars during a predefined period;
- determining a maximum load of each of the plurality of elevator cars from the one or more load measurements of each of the plurality of elevator cars such that the maximum load for each of the plurality of elevator cars is associated with the predefined period;
- generating a modified load setting for each of the plurality of elevator cars based on the respective maximum load of each of the plurality of elevator cars; and
- activating the modified load setting of each of the plurality of elevator cars in place of an original load setting during the predefined period such that the modified load setting replaces the original load setting for the predefined period, wherein the modified load setting defines an adjusted capacity of each of the plurality of elevator cars relative to the load setting.

10. The method of claim 9, further comprising:

receiving a call for at least one of the plurality of elevator cars during the predefined period;

measuring a new load of each of the plurality of elevator cars; and comparing the new load to the modified load setting of each of the plurality of elevator cars.

11. The method of claim 10, further comprising:

determining a load of a first elevator car of the plurality of elevator cars does not exceed the modified load setting;

rendering the first elevator car operable to receive the call; and dispatching the first elevator car to the call.

12. The method of claim 10, further comprising determining a load of a first elevator car of the plurality of elevator cars does exceed the modified load setting;

rendering the first elevator car inoperable to receive the call; and preventing dispatch of the first elevator car to the call.

13. The method of claim 9, wherein the original load setting is substituted by the modified load setting for the predefined period, the method further comprising:

replacing the modified load setting with the original load setting upon completion of the predefined period.

14. The method of claim 9, further comprising:

determining an updated maximum load for each of the plurality of elevator cars in response to measuring one or more additional loads during the predefined period; and generating an updated modified load setting for each of the plurality of elevator cars based on the respective updated maximum load.

15. A method for positioning an elevator car, the method comprising:

determining an occupancy of each of a plurality of locations by:

determining a first load measurement of the elevator car upon arriving at each of the plurality of locations;

determining a second load measurement of the elevator car upon departing from each of the plurality of locations; and determining a difference between the first load measurement and the second load measurement; and moving the elevator car to a first location with a total occupancy that is greater than the occupancy at each respective location of the plurality of locations when the elevator car is in an inactive state.

16. The method of claim 15, further comprising:

parking the elevator car at the first location when the elevator car is in the inactive state.

17. The method of claim 15, further comprising:

updating the occupancy of one or more of the plurality of locations in response to determining a second elevator car has arrived at the respective one or more of the plurality of locations.

18. The method of claim 17, further comprising:

moving the elevator car from the first location to a second location in response to determining the total occupancy of the second location is greater than the total occupancy of the first location and each respective location of the plurality of locations.

* * * * *